United States Patent
Koskela

[15] 3,653,280
[45] Apr. 4, 1972

[54] FOUR-PINION DIFFERENTIAL
[72] Inventor: Robert B. Koskela, Pontiac, Mich.
[73] Assignee: General Motors Corporation, Detroit, Mich.
[22] Filed: Aug. 5, 1970
[21] Appl. No.: 61,147

[52] U.S. Cl. ................................................74/713
[51] Int. Cl. ..............................................F16h 1/40
[58] Field of Search.......................................74/713

[56] References Cited

UNITED STATES PATENTS

| | | | |
|---|---|---|---|
| 2,701,972 | 2/1955 | Hoffman | 74/713 X |
| 2,774,253 | 12/1956 | Minard et al. | 74/713 X |
| 1,461,102 | 7/1923 | Sternbergh | 74/713 |
| 3,593,595 | 7/1971 | Taylor | 74/713 |

FOREIGN PATENTS OR APPLICATIONS

| | | | |
|---|---|---|---|
| 692,007 | 6/1940 | Germany | 74/713 |
| 936,844 | 12/1955 | Germany | 74/713 |
| 255,952 | 7/1926 | Great Britain | 74/713 |

*Primary Examiner*—Carlton R. Croyle
*Assistant Examiner*—Thomas C. Perry
*Attorney*—Jean L. Carpenter and Arthur N. Krein

[57] ABSTRACT

A four-pinion differential mechanism in which a cross-shaft having a cross-bore therein encircles and is carried by the pinion shaft of a conventional two-pinion differential. The cross-shaft carries an additional two pinions. This structure permits conversion of a conventional open-faced two-pinion differential into a higher capacity four-pinion differential.

3 Claims, 3 Drawing Figures

PATENTED APR 4 1972 3,653,280

INVENTOR.
Robert B. Koskela
BY
Arthur N. Krein
ATTORNEY

FOUR-PINION DIFFERENTIAL

This invention relates to automotive differentials and, in particular, to a four-pinion differential.

Differentials used in automobiles are designed primarily to transmit equal torque to a pair of aligned wheel axle shafts of the vehicle and to compensate for the difference in speed at each wheel while cornering. In general, two-pinion differentials are adequate to transmit relatively low torque, but when higher torque requirements are encountered, a larger number of pinion gears are used in the differential.

In those differentials wherein more than two pinions have been employed, it has been customary to mount them upon a spider having the required number of hub extensions thereon to receive the pinions or by the use of, in effect, a two-piece spider arrangement suitably supported within the differential case. This, of course, requires the use of a split differential case to permit installation of these spiders and the associated number of pinions in the differential case. In addition to the requirement of making a two-part casing in lieu of a one-piece casing, the use of such a split differential case creates additional problems in the machining of these two parts and the maintaining of tolerances between related parts and associated problems in the final assembly of such a differential mechanism.

It is, therefore, the principal object of this invention to improve differential mechanisms whereby a cross-shaft, encircling the pinion shaft of the differential, is used to support an additional pair of pinion gears independently of the differential case.

Another object of this invention is to provide a two-pinion and cross-shaft arrangement which is readily adaptable for use with a conventional two-pinion differential to convert it into a four-pinion differential.

These and other objects of this invention are obtained by means of a cross-shaft having a cross-bore therein whereby the cross-shaft encircles and is carried by the pinion shaft of a conventional two-pinion type differential. The cross-shaft carries at its outer ends thereof a pair of pinion gears retained in position by retaining caps which also serve as bearing supports for these pinion gears.

For a better understanding of the invention, as well as other objects and further features thereof, reference is had to the following detailed description of the invention to be read in connection with the accompanying drawings, wherein.

Figure 1:
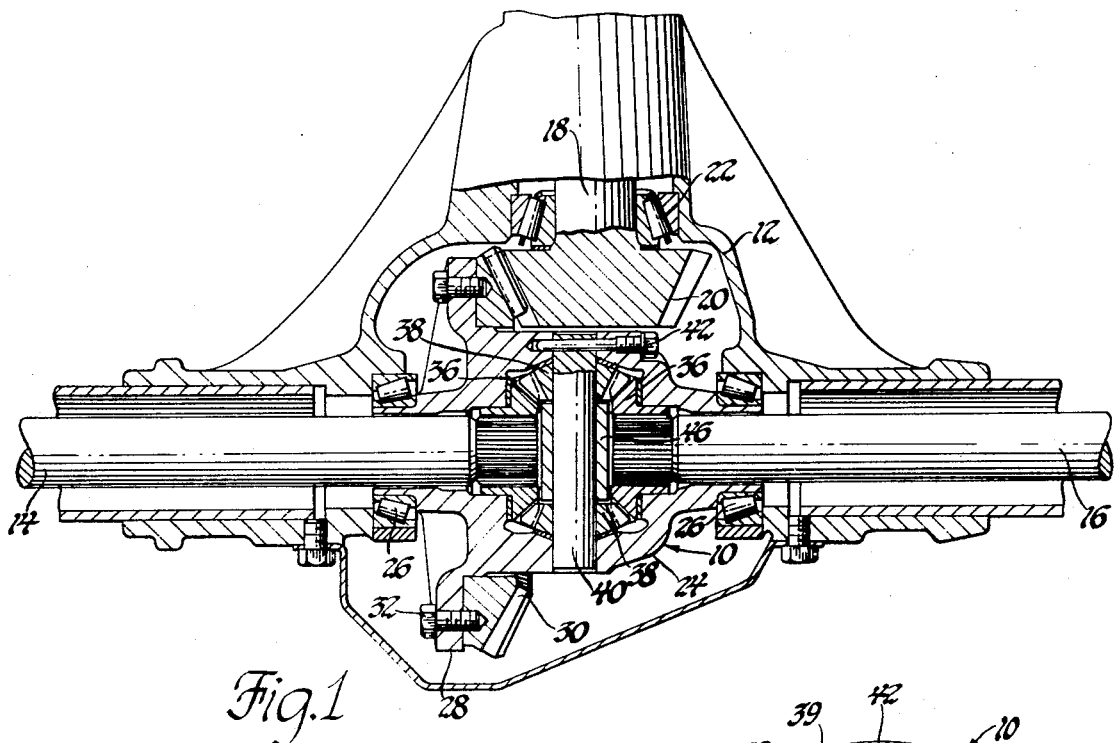
FIG. 1 is a sectional view of a differential mechanism constructed in accordance with the invention.

Referring now to FIG. 1, the differential mechanism, generally designated 10, encased in a rear axle housing 12 is adapted to differentially drive a pair of aligned axle shafts 14 and 16 projecting inwardly of said differential mechanism from opposite directions and, in turn, is driven by a differential drive pinion shaft 18 having a drive pinion 20 at one end thereof. Differential drive pinion shaft 18 is mounted for rotation adjacent to the differential mechanism as by means of bearing 22 in rear axle housing 12.

The differential mechanism 10 comprises a differential case 24 rotatably supported at opposite ends as by means of side bearings 26 in rear axle housing 12 for rotation at right angles to the axis of differential drive pinion shaft 18. The differential case 24 has a circumferentially radiating flange 28 upon which is mounted a ring gear 30 as by bolts 32. Ring gear 30 meshes with drive pinion 20 whereby the differential case 24 rotates about the axis of side bearings 26.

Figure 3:
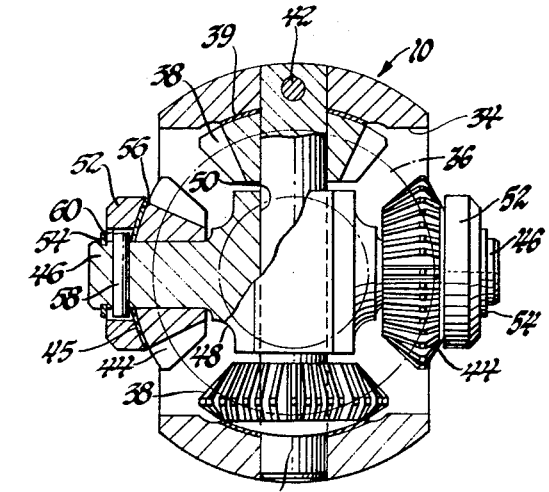
Figure 2:
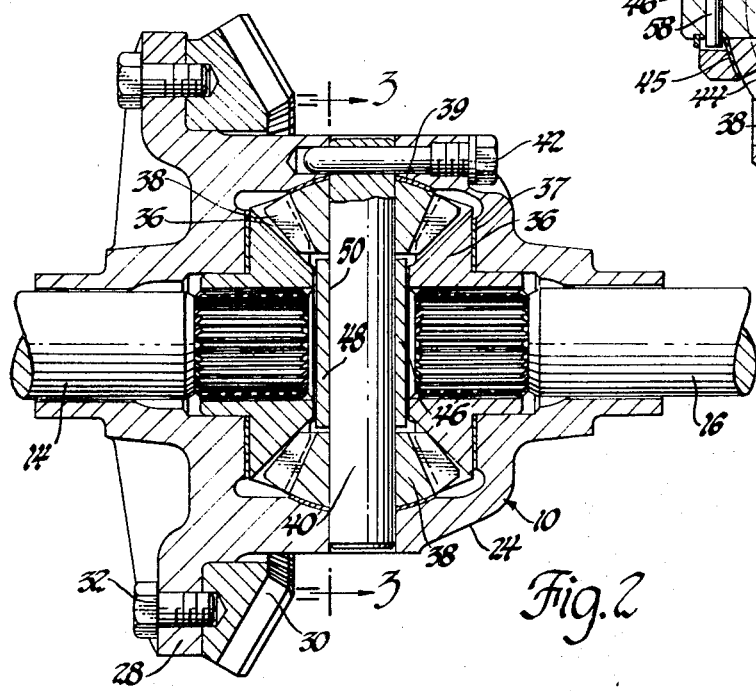
FIG. 2 is an enlarged sectional view of the differential mechanism of FIG. 1; and, FIG. 3 is a sectional view taken along line 3—3 of FIG. 2.

Differential case 24 is shown as a conventional unitary differential case having openings or windows 34 on either side, as shown in FIG. 3, through which are installed the usual side gears 36 splined to shafts 14 and 16 and a pair of pinion gears 38. The pinion gears are conventionally mounted on a transverse pinion shaft or pin 40 which is retained in the differential case 24 by a locking bolt pin 42. Thrust washers 37 and 39 are positioned between the inner face of differential case 24 and the side gears 36 and pinion gears 38, respectively.

This portion of the construction, just described, is conventional and operates such that rotation of the differential case 24 around the axis of the side bearings 26 causes the pinion gears 38 to be driven by the pinion shaft 40 in an orbit which in turn rotates the side gears 36 around their axes to drive the axle shafts 14 and 16 to which these side gears are attached.

Now, in accordance with the present invention, there is provided an additional two-pinion gears 44 which are rotatably mounted on a cross-shaft 46 so as to be in engagement with the side gears 36 as are the pinion gears 38. The cross-shaft 46 is provided with a central body portion 48 having a cross-bore 50 therethrough so that the cross-shaft encircles and is carried by the pinion shaft 40 so as to accept torque load therefrom. Retaining caps 52 are secured in a suitable manner on the ends of the cross-shaft 46, as for example, by retaining rings 54 positioned in suitable grooves formed for this purpose at opposite ends of the cross-shaft, the retaining caps thus act as abutments for a thrust washer 45 encircling the pinion shaft between each retaining cap and its cooperating pinion gear 44. As shown in FIG. 3, each retaining cap 52 is provided with a semi-spherical seat 56 on the inner face thereof against which the semi-spherical outer face of its cooperating pinion gear 44 is journaled with a thrust washer 45 positioned therebetween. Transverse pins 58 extending through the cross-shaft 46 and positioned within the inner radial notched portions 60 of the retaining caps 52 prevent rotation of the retaining caps relative to the pinion gears 44.

In operation, rotation of the differential case 24 drives pinion gears 38 in the conventional manner through pinion shaft 40. In addition, torque is transmitted from the pinion shaft 40 to cross-shaft 46 and then to pinion gears 44 which assist pinion gears 38 in driving the side gears 36. In this way, the four-pinion gears 38, 44 are arranged to be driven by the single pinion shaft 40 and the cross-shaft 46, which avoids the necessity of using a split differential case to permit the use of four-pinion gears, as required in the prior art. This structural arrangement can also be used to convert a conventional two-pinion differential to a higher capacity four-pinion type differential simply by installation to the conventional two-pinion differential of the cross-shaft 46, pinion 44, retaining caps 52, and retaining rings 54 and pins 58.

What is claimed is:

1. A differential mechanism having a rotatable unitary differential housing having windows on opposite sides thereof, aligned axial shafts projecting into said housing from opposite directions coaxially with the axis of said housing and having side gears mounted thereon inside said differential housing, a first pinion shaft secured to said differential housing and disposed at right angles to and intersecting the axis of said axle shafts, a pair of pinion gears mounted on opposite ends of said pinion shaft and meshing with said side gears, a second pinion shaft having a cross-bore therein, said second pinion shaft being carried by said first pinion shaft with the first pinion shaft extending through the cross-bore of said second pinion shaft with opposite ends of said second pinion shaft extending through said windows, a second pair of pinion gears rotatably supported at opposite ends of said second pinion shaft in engagement with said side gears and, retaining means, each having a pinion gear bearing support surface thereon, secured to said second pinion shaft outboard of the said pinion gears thereon with said pinion gears engageable against said bearing support surfaces.

2. A differential mechanism according to claim 1 wherein said retaining means are secured to said second pinion shaft to provide nonrotatable bearing surfaces against which said pinion gears carried by said second pinion shaft are journaled.

3. In a differential mechanism having a rotatable unitary differential housing with pinion receiving openings on opposite sides thereof, aligned axial shafts projecting into said housing from opposite directions coaxially with the axis of said housing and having side gears mounted thereon inside said differential housing, a pinion shaft secured to said differential housing and disposed therein at right angles to and intersecting the axis of said axle shafts, pinion gears rotatably journaled on said pinion shaft at opposite ends thereof in position to mesh with said side gears; the improvements comprising, a cross-shaft having a cross-bore therein encircling said pinion shaft intermediate said pinion gears to be carried by said pinion shaft in position so that opposite ends of said cross-shaft extend through said pinion receiving openings in said unitary differential housing, a second set of pinion gears rotatably supported at opposite ends of said cross-shaft, and pinion retaining means including bearing means secured at opposite ends to said cross-shaft outboard of said pinion gears to retain said pinion gears in engagement with said side gears.

* * * * *